United States Patent [19]
Lawler

[11] Patent Number: 5,905,522
[45] Date of Patent: May 18, 1999

[54] RESOURCE ALLOCATION METHOD FOR INTERACTIVE TELEVIDEO SYSTEM

[75] Inventor: Frank A. Lawler, Seattle, Wash.

[73] Assignee: Microsoft Corporation, Redmond, Wash.

[21] Appl. No.: 08/521,359

[22] Filed: Aug. 31, 1995

[51] Int. Cl.[6] .................................................. H04N 7/14
[52] U.S. Cl. ........................................ 348/7; 398/200.47
[58] Field of Search .............................. 348/7, 6, 12, 13; 395/200.09, 200.47

[56] References Cited

U.S. PATENT DOCUMENTS

| | | | |
|---|---|---|---|
| 5,008,447 | 4/1991 | Farry et al. | 348/7 |
| 5,436,653 | 7/1995 | Ellis et al. | 455/2 |
| 5,515,511 | 5/1996 | Nguyen et al. | 348/7 |
| 5,583,864 | 12/1996 | Lightfoot et al. | 348/7 |
| 5,583,994 | 12/1996 | Rangan | 348/7 |
| 5,606,359 | 2/1997 | Yonden et al. | 348/12 |

*Primary Examiner*—Victor R. Kostak
*Attorney, Agent, or Firm*—Klarquist Sparkman Campbell Leigh & Whinston, LLP

[57] ABSTRACT

The present invention includes a method of delivering programming over an interactive television or televideo (IT) system. The IT system includes a central control node that delivers programming to multiple subscribers or viewers. Each viewer has a video display set (e.g., a television receiver) and an associated interactive controller in communication with the central control node and that is responsive to input from the viewer for controlling programming on the video display set. With reference to a preferred embodiment, the method of this invention includes allocating dedicated programming services among the viewers associated with the IT system. The dedicated programming services may be allocated according to the available resources of the IT system, the relative values of different dedicated programming services, or both. As a result, the method of this invention minimizes disruption of dedicated programming services and particularly those of highest value or priority.

21 Claims, 4 Drawing Sheets

RESOURCE ALLOCATION METHOD FOR INTERACTIVE TELEVIDEO SYSTEM

FIELD OF THE INVENTION

The present invention relates to interactive television or televideo systems and, in particular, to a method of allocating system resources for delivering programming to viewers.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, programming available from IT systems under development could include the equivalent of 500 channels of video broadcasting and unlimited numbers of interactive applications.

Conventional television broadcasting transmits a common or universal video signal simultaneously to all viewers associated with the network. In traditional aerial television broadcasting, each television station transmits a television signal corresponding to the programming available on one channel. In traditional cable television broadcasting, a cable television network operator receives video signals from multiple separate television stations or providers and rebroadcasts the various video signals on different channels of the cable television network. In both types of traditional broadcasting, the broadcaster controls the schedule for transmitting the universal television programming.

In contrast to such centralized scheduling of conventional universal television programming, IT systems provide dedicated programming services that transmit dedicated programming to individual viewers at times they request. An example of such dedicated programming services is sometimes referred to as video-on-demand (VOD). A VOD service transmits dedicated programming (e.g., a motion picture) to a viewer at a time requested by the viewer. A related dedicated programming service is preview-on-demand (POD). A POD service functions in cooperation with a VOD service, for example, to provide viewers with dedicated previews of programming available from the VOD service.

In one IT system implementation, available dedicated programming is stored in a digital format within a memory system in the IT system. In response to the viewer request, the IT system retrieves the selected programming from the memory system and transmits the programming to the viewer. In this type of implementation, the IT system uses a variety of IT system components such as computer processors, memory systems, and programming transmission systems to deliver programming to viewers.

IT system components or resources, like any physical system, have capacity limits. IT systems typically will not include resources sufficient to provide universal simultaneous transmission of dedicated programming to all viewers subscribing to the system. Such resources would be uneconomical and unnecessary because of the low probability that all subscribers would request dedicated programming services simultaneously. Accordingly, IT systems will include resources for providing dedicated programming transmission at some partial level of viewer usage, probably not exceeding regular peak levels of service. As an estimate it is expected IT systems could have resources to provide simultaneous transmission of programming to between 10 and 40 percent of system subscribers.

A consequence of such a system configuration is that viewer demands for dedicated programming services will sometimes exceed the IT system resources from providing such services. Under these circumstances, some requests for dedicated programming services would not be met. In some possible implementations, excessive demands on the dedicated programming service could result in disruption of programming delivery to some or all viewers. However, disruption of programming is highly undesirable.

In other implementations, dedicated programming services could be provided on a first-come, first-served basis according to the sequence in which viewers request the dedicated programming services. However, different dedicated programming services are expected to have premiums associated with them. For example, transmission of a conventional preview available from the POD service might generate for the IT system operator 10 units of revenue that is paid as an advertising fee by the programming provider. In contrast, a current-release motion picture available from the VOD service might generate for the IT system operator 200 units of revenue that is paid by the viewer requesting the programming. Accordingly, a disadvantage of a first-come, first-served basis of allocating resources is that dedicated programming of relatively low value (e.g., previews could dominate the dedicated programming service to the exclusion of higher value programming (e.g., full-length programming).

SUMMARY OF THE INVENTION

The present invention includes a method of allocating resources of an interactive television or televideo (IT) system for delivering programming to viewers. The IT system includes a central control node that delivers programming to multiple subscribers or viewers. Each viewer has a video display set (e.g., a television receiver) and an associated interactive controller that is in communication with the central control node and responsive to input from the viewer for controlling programming on the video display set.

With reference to a first preferred embodiment, the method of this invention includes allocating dedicated programming services among the viewers associated with the IT system. Dedicated programming services, such as a video-on-demand service, provide dedicated programming viewers at times they request and are contrasted with conventional universal programming services.

Dedicated programming available from the dedicated programming service typically has a preferred format such as, for example, a high-resolution digital video signal that corresponds to a S-VHS quality video signal. The IT system identifies the resources, referred to as preferred resources, for delivering the programming in the preferred format.

The IT system also identifies alternative resources for delivering the programming in an alternative format that requires fewer IT system resources. For example, an alternative format to the preferred high-resolution digital video signal format could be a conventional-resolution digital video signal that corresponds to a standard VHS quality video signal. Such an alternative format could require only one-half the level of some resources required by the preferred format.

Whenever a viewer requests a dedicated programming service, the IT system identifies the IT system resources that are available and compares them with the preferred resources required to deliver the dedicated programming in the preferred format. If it has at least the preferred resources available, the IT system delivers the selected programming to the viewer in the preferred format. If it has available at least the alternative resources, but not the preferred resources, the IT system delivers the selected programming to the viewer in the alternative format.

In this first embodiment, resources for the dedicated programming services are allocated according to the available resources of the IT system. In addition or alternatively, resources for the dedicated programming services may be allocated according to the relative values or priorities of different dedicated programming services. As a result, this invention can minimize disruption of dedicated programming services and provide for delivery of programming with the highest value or priority.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 1:
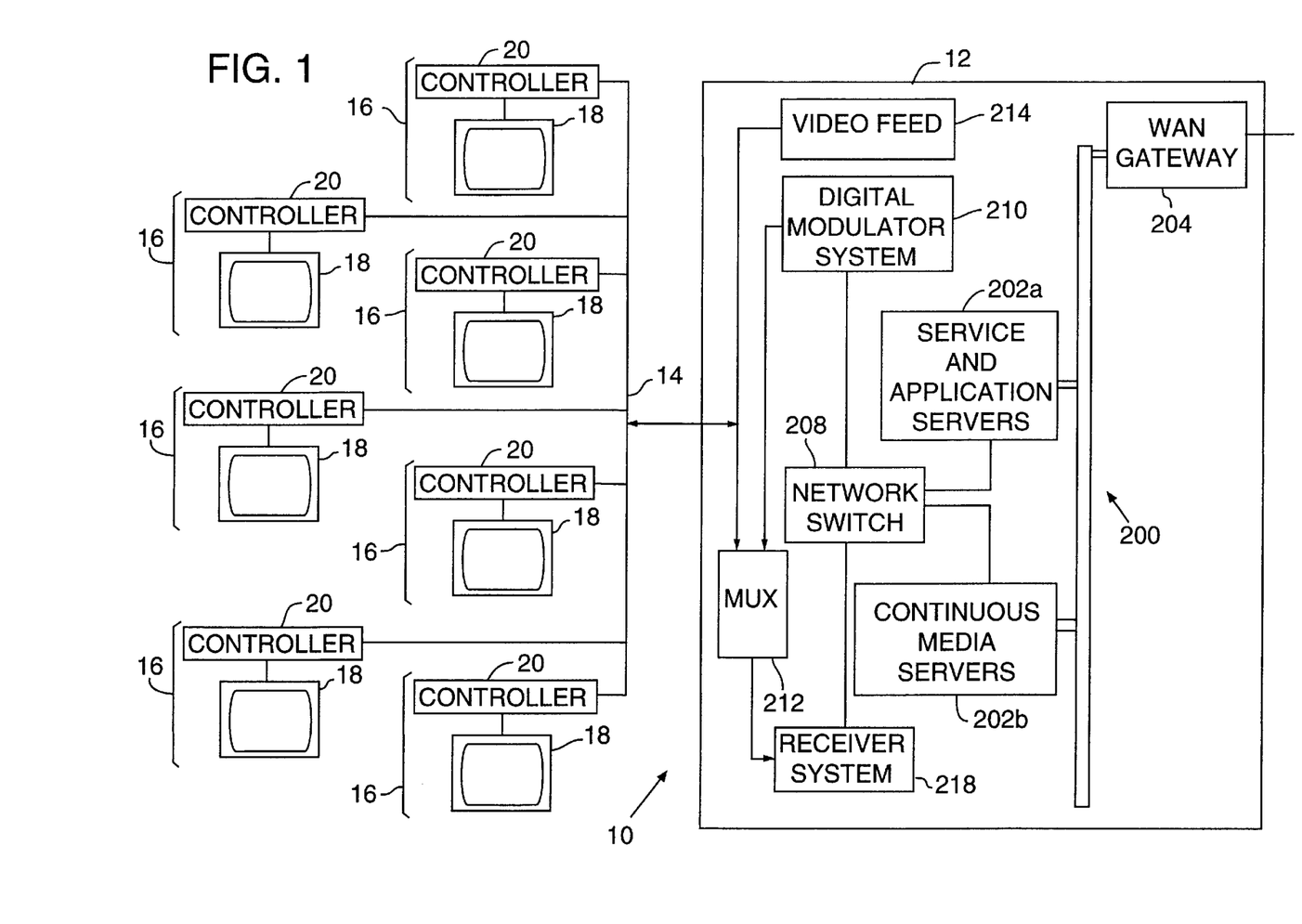
FIG. 1 is a block diagram of an interactive televideo system used for the preferred embodiment of this invention.
Figure 2:
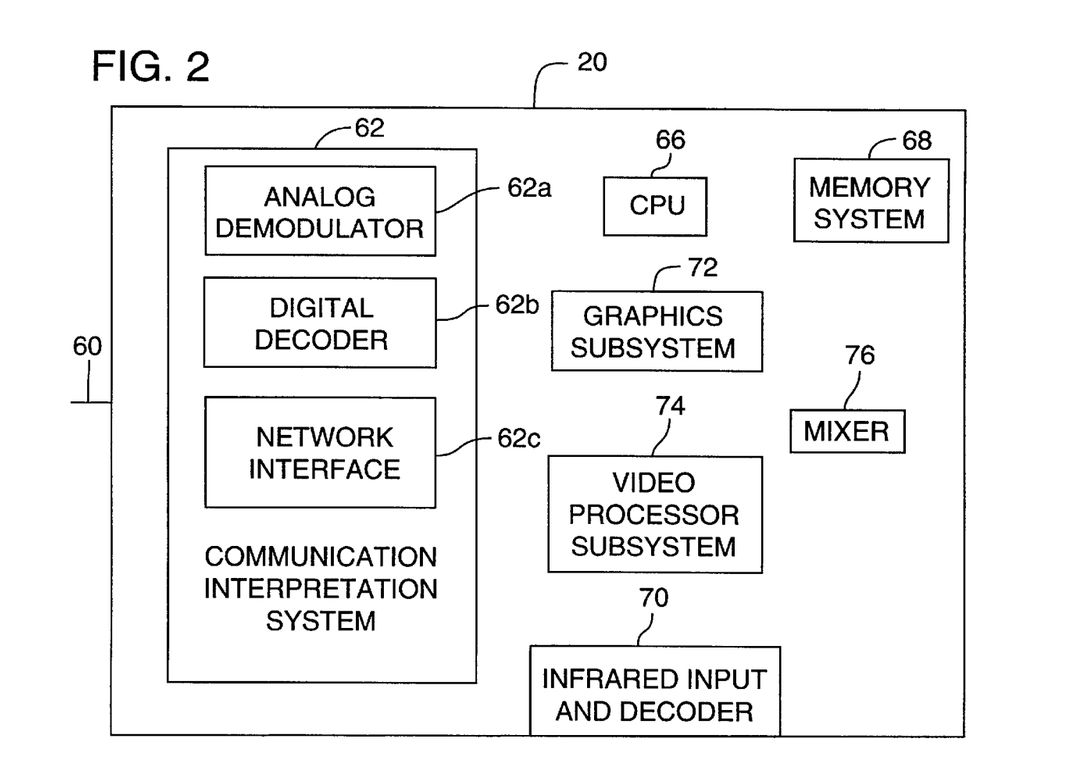
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20.

Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control node 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes a terminal 60 that delivers communication or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control node 12 at input 60. Video decoder 62b functions as a digital equivalent of demodulator 62a for selecting one of multiple digital video signals received at input 60 from central control node 12. Network communication interface 62c communicates with central control node 12 with digital information carried over baseband frequencies. The baseband frequencies may be below the conventional analog video signal frequencies, above the digital video signal frequencies, or between the frequencies of analog or digital video signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 4) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, including interactive system user interface images, on video display set 18. A video processor subsystem 74, also controlled by CPU 66, provides control in the rendering of video imagery, including decompressing digital video signals and sizing and positioning a video display window.

A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3:
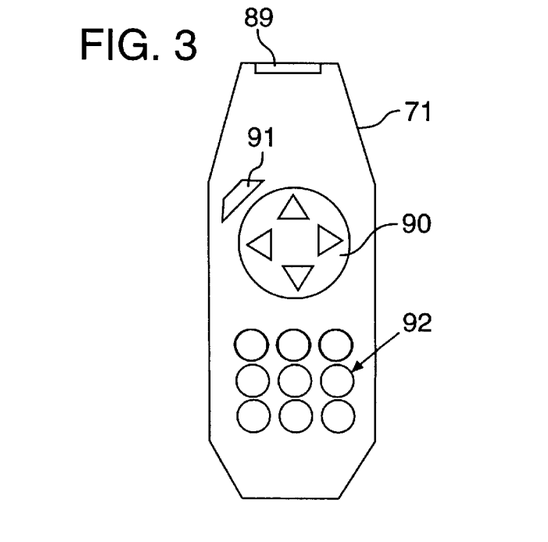
FIG. 3 is a plan diagram of a viewer control unit for providing viewer input to the interactive station controller of FIG. 2.

Referring to FIG. 3, viewer control unit 71 includes an infrared transmitter window 89 through which control unit 71 emits infrared signals to infrared input 70 of station controller 20. A directional control keypad 90 allows a viewer to transmit signals for moving a cursor (i.e., an indication of position, not shown) rendered on display screen 78 of video display set 18. The cursor may be rendered on display screen 78 as a graphic character or icon or by changing the graphic characteristics of display interface features where the cursor is positioned. The viewer may initiate or activate command options by depressing an action key 91, may enter numeric values with numeric key pad 92, and may access user interface menu by depressing a menu key 93.

IT system 10 provides a variety of programming services including conventional television broadcasting and transmission of dedicated programming services. The latter are characterized as being activated in response to requests or other communications from a viewer. The dedicated programming services typically are provided by IT system 10 as or in conjunction with computer-executed applications that include video-on-demand (VOD), preview-on-demand (POD), audio-on demand (AOD), and games or other interactive applications.

As described above with reference to FIGS. 1 and 2, IT system 10 employs a CPU 66, memory system 68, and programming transmission systems (e.g., central control node 12 and transmission network 14) to deliver Programming to each viewer station 20. CPU 66, memory system 68, and the programming transmission system are resources of IT system 10 that have finite capacity, like any physical components.

Capacity limitations associated with the programming transmission system, sometimes referred to as the network bandwidth capacity, include the total volume of signals or data that can be carried on network 14, the rate at which data or signals are delivered over network 14, and the number of available dedicated programming service channels within central control node 12. The network bandwidth capacity can be reached, for example, when there are large numbers of dedicated programming service requests or other IT system communications, all available dedicated programming service channels are being used, and the volume of information carried on IT system 10 delays delivery of programming or portions of it below levels acceptable to viewers. Consequences of reaching the network bandwidth capacity are that dedicated programming and other information cannot be delivered to a viewer or is intermittently delayed such that the video display quality is unacceptable.

The capacity of memory system 68 can be met when, for example, too many application threads are executed simultaneously by CPU 66 in station controller 20, too many high-resolution graphics are loaded into memory 68, and too much of a high resolution audio segment is loaded in memory system 68. The capacity of CPU 66 can be met when, for example, too many processor cycles are required to run existing or requested processing threads. Consequences of meeting the capacity of memory system 68 or CPU 66 include an inability to execute a requested application or to allocate memory for an audio or graphic portion of a service requested by the viewer, thereby interrupting acceptable delivery of the programming.

In a first preferred embodiment of this invention, dedicated programming services are provided selectively in a preferred medium or format or an alternative medium or format according to the availability of IT system resources. The preferred format of dedicated programming services typically provides higher resolution or quality at the expense of greater IT system resources requirements. The alternative format provides the dedicated programming services at a lower resolution or quality that requires fewer IT system resources.

In accordance with this invention, an alternative format of dedicated programming service is used when IT system 10 lacks the resources required to provide the service in the preferred format. Table 1 lists examples of preferred and corresponding alternative modes of dedicated programming services.

TABLE 1

Preferred and Alternative Modes

| Preferred Format | Alternative Format |
| --- | --- |
| S-VHS quality MPEG stream | VHS quality MPEG stream |
| 24-bit graphic | 8-bit graphic |
| code resource for graphics animation sequence | code resource for final image of graphics animation sequence |
| CD-quality sound | telephone-quality sound |
| 8-bit graphic | 1-bit black and white dithered graphic |

Table 1 lists for each preferred format one corresponding alternative format of the same class (i.e., video, graphics, audio). However, a preferred format could have a hierarchy of alternative formats in different classes. For example, a preferred format of S-VHS quality digital video for video-on-demand previews could have a first alternative format of VHS quality digital video, and subsequent alternative modes in the form of 24-bit graphics and 8-bit graphics. The availability of alternative formats requiring fewer IT system resources than the preferred format allows IT system 10 to provide dedicated programming services in the absence of sufficient IT system resources to deliver the preferred format in an acceptable manner.

Figure 4:
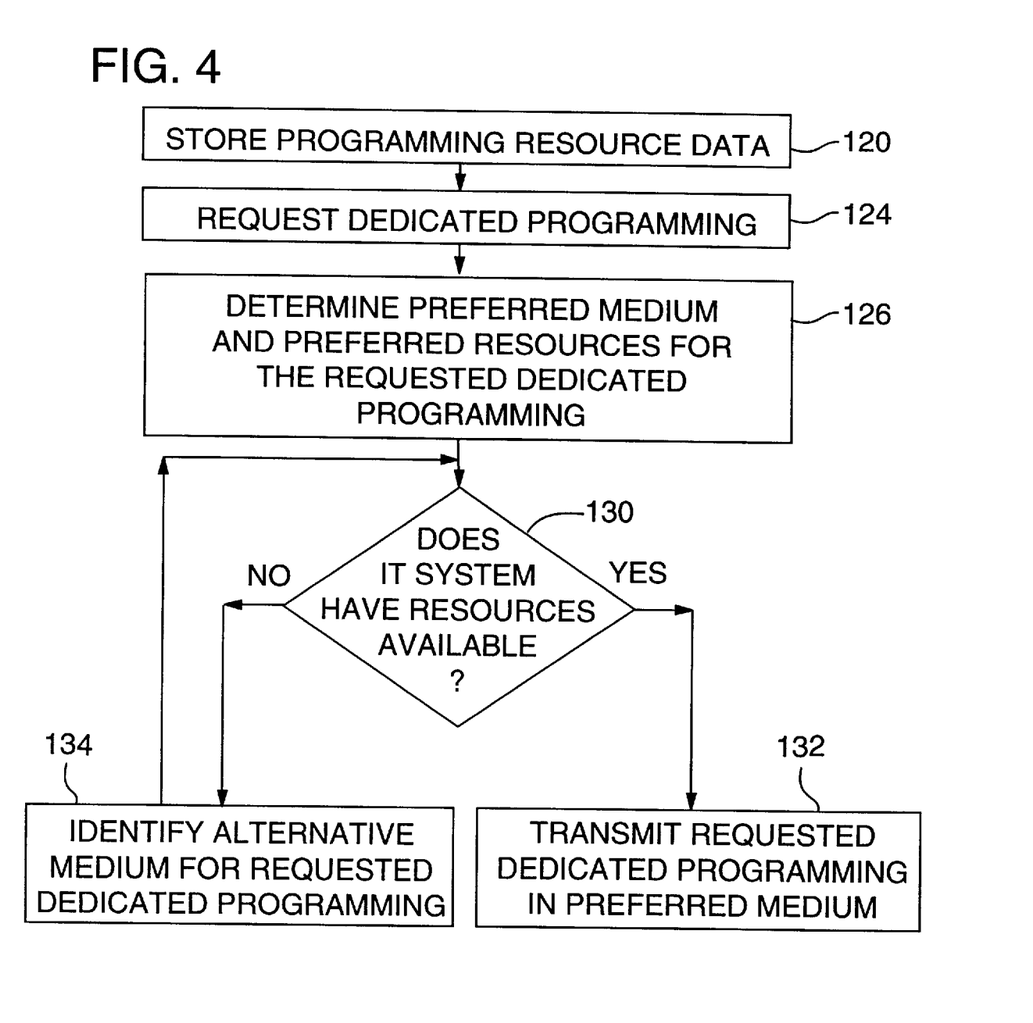
FIG. 4 is a flow diagram of a first preferred method of allocating resources of an interactive televideo system for delivering dedicated programming to viewers.

FIG. 4 is a flow diagram showing a first preferred embodiment of a method of delivering dedicated programming services to viewers associated with IT system 10. In this embodiment, the method includes delivering dedicated programming services according to the IT system resources required to deliver the programming and the IT system resources that are available. Dedicated programming services that cannot be delivered acceptably in a preferred format for lack of IT system resources are delivered in an alternative format that requires fewer IT system resources.

Process block 120 indicates that IT system 10 stores programming resource data representing the resources of IT system 10 required to deliver dedicated programming available from the dedicated programming service. The resources of IT system 10 required for delivering the programming can include, for example, availability of predetermined network bandwidth of IT system 10 relating to capacities of network 14, central control node 12, and viewer stations 16, amounts of memory in memory system 68 of station controller 20, and processing capacity of CPU 66 in station controller 20.

The programming resource data preferably are arranged as a programming resource database that is stored within central control node 12 and includes: a "MediaType" object that identifies the medium as being of a class, for example, video, audio, bitmap, animation/vector drawing code, a "MediaMoniker" object that identifies a pathname to or address of the medium (exemplary pathnames are listed), a "RAMRequirement" object that identifies the minimum memory requirements to store the media in memory system 68 of station controller 20, a "BandwidthRequirement" object that identifies the minimum transmission bandwidth of network 14 needed to deliver the media so that it can be rendered for the viewer in an acceptable manner, a "ProcessorRequirement" object that identifies a relative number of processor cycles required to process the media in a manner acceptable to viewers, and an "AlternativeMedia" object that points to alternative objects having fewer resource requirements. Table 2 summarizes the programming resource database objects.

TABLE 2

An object structure for managing media retrieval

| Object I.D. | Explanation |
|---|---|
| MediaType | bitmap, audio, video, animation/vector drawing definition, etc. |
| MediaMoniker | pathname to or address of actual media |
| RAMRequirement | minimum RAM needed to store media at station controller |
| BandwidthRequirement | minimum bandwidth needed to deliver media quickly enough to viewer station |
| ProcessorRequirement | minimum cycles available to process drawing or animation quickly enough at viewer station |
| AlternativeMedia | pointer to alternative object with less resource requirements |

Tables 3A–3F list exemplary programming resource database entries for display media ranging from a high resolution digital video format to a 1-bit monochrome image display format. Tables 3A–3F show the differing system resource requirements for each medium and are hierarchically as successive preferred and alternative media, as indicated by the ObjectID values identifying the media and listed in the AlternativeMedia objects. For example, the high-resolution digital video signal format in Table 3A has ObjectID value 13823 and lists as the AlternativeMedia value 13824, which is the ObjectID for the conventional digital video signal format in Table 3B. The alternative value of −1 for the 1-bit dithered monochrome format of Table 3F indicates that no alternative format is available for transmission.

TABLE 3A

| Field | Value |
|---|---|
| ObjectID | 13823 |
| MediaType | MPEG |
| MediaMoniker | \\BigServer\video\ArtsyVideo.mpg |
| RAMRequirement | 1024K |

TABLE 3A-continued

| Field | Value |
|---|---|
| BandwidthRequirement | 3072 Kbps |
| ProcessorRequirement | 50% |
| Comment | 3.0 Mbps MPEG video, approx. S-VHS resolution |
| AlternativeMedia | 13824 |

TABLE 3B

| Field | Value |
|---|---|
| ObjectID | 13824 |
| MediaType | MPEG |
| MediaMoniker | \\BigServer\video\ShoddyVideo.mpg |
| RAMRequirement | 512K |
| BandwidthRequirement | 1500 Kbps |
| ProcessorRequirement | 25% |
| Comment | 1.5 Mbps MPEG video, approx. VHS resolution |
| AlternativeMedia | 13900 |

TABLE 3C

| Field | Value |
|---|---|
| ObjectID | 13900 |
| MediaType | CODE |
| MediaMoniker | \\BigServer\anim\bin\FlashyAnim.exe |
| RAMRequirement | 256K |
| BandwidthRequirement | 512 Kbps |
| ProcessorRequirement | 20% |
| Comment | code that draws an animation on the screen using built-in STB draw routines. |
| AlternativeMedia | 14002 |

TABLE 3D

| Field | Value |
|---|---|
| ObjectID | 14002 |
| MediaType | BMP |
| MediaMoniker | \\BigServer\bitmap\HighArt.bmp |
| RAMRequirement | 256K |
| BandwidthRequirement | 512 Kbps |
| ProcessorRequirement | 20% |
| Comment | 24 bit picture |
| AlternativeMedia | 14100 |

TABLE 3E

| Field | Value |
|---|---|
| ObjectID | 14100 |
| MediaType | BMP |
| MediaMoniker | \\BigServer\bitmap\PopArt.bmp |
| RAMRequirement | 84K |
| BandwidthRequirement | 168 Kbps |
| ProcessorRequirement | 10% |
| Comment | 8 bit picture |
| AlternativeMedia | 14523 |

TABLE 3F

| Field | Value |
| --- | --- |
| ObjectID | 14523 |
| MediaType | BMP |
| MediaMoniker | \\BigServer\bitmap\LowArt.bmp |
| RAMRequirement | 12K |
| BandwidthRequirement | 20 Kbps |
| ProcessorRequirement | 5% |
| Comment | 1-bit picture, dithered black and white |
| AlternativeMedia | −1 |

Process block 124 indicates that a viewer at a selected viewer station 16 requests dedicated programming from IT system 10.

Process block 126 indicates that central control node 12 determines from the dedicated programming request the preferred medium for the preferred requested dedicated programming and determines from the dedicated programming database the system resources required for the preferred medium.

Decision block 130 represents an inquiry as to whether IT system 10 has available the resources to meet the resource requirements of the preferred medium. With reference to a dedicated programming request that requires a high resolution digital video stream, for example, central control node 12 determines whether transmission network 14 has sufficient available bandwidth to meet the BandwidthRequirement set forth in the dedicated programming database and inquires of CPU 66 whether it and memory system 68 at station controller have sufficient capacity to meet the RAMRequirement and ProcessorRequirement.

Alternatively, CPU 66 in interactive station controller 20 determines whether it and memory system 68 have sufficient available resources for the requested programming and, if necessary, modifies the request sent to central control node 12 accordingly. Decision block 130 proceeds to process block 132 whenever IT system 10 has available sufficient resources to adequately transmit the requested dedicated programming, and otherwise proceed to process block 134.

Process block 132 indicates that central control node 12 obtains and transmits the requested dedicated programming in the preferred medium.

Process block 134 indicates that central control node 12 determines from the dedicated programming database an alternative medium that requires fewer IT system resources than the preferred medium. The operation of process block 134 in connection with the alternative medium is substantially the same as the operation of process block 126 for the preferred medium. The alternative medium is redesignated the preferred medium and process block 134 returns to decision block 130.

This embodiment allocates IT system resources to a dedicated programming service requested by a viewer according to a programming valuation based upon the IT system resources required to transmit the programming. It will be appreciated, however, that the present invention is capable of allocating IT system resources according to programming valuations based alternatively or additionally on other criteria. For example, dedicated programming available from IT system 10 can be assigned priorities that relate, for example, to fees received by the IT system operator for transmitting the programming, a weighted combination of fees versus system requirements for transmitting the programming, and or any other criteria.

The method of FIG. 4 has been described with specific reference to IT system resources in the form of availability of predetermined amounts of memory in memory system 68 of station controller 20, network bandwidth of network 14, central control node 12, and viewer stations 16, and processing capacity of CPU 66 in station controller 20. It will be appreciated, however, that the method is similarly applicable to any components of IT system 10 that can reach their maximum operating capacities and constrain delivery of dedicated programming. Moreover, the method is applicable to delivering programming that is not dedicated to a particular viewer station but that utilizes similar IT system resources.

Figure 5:
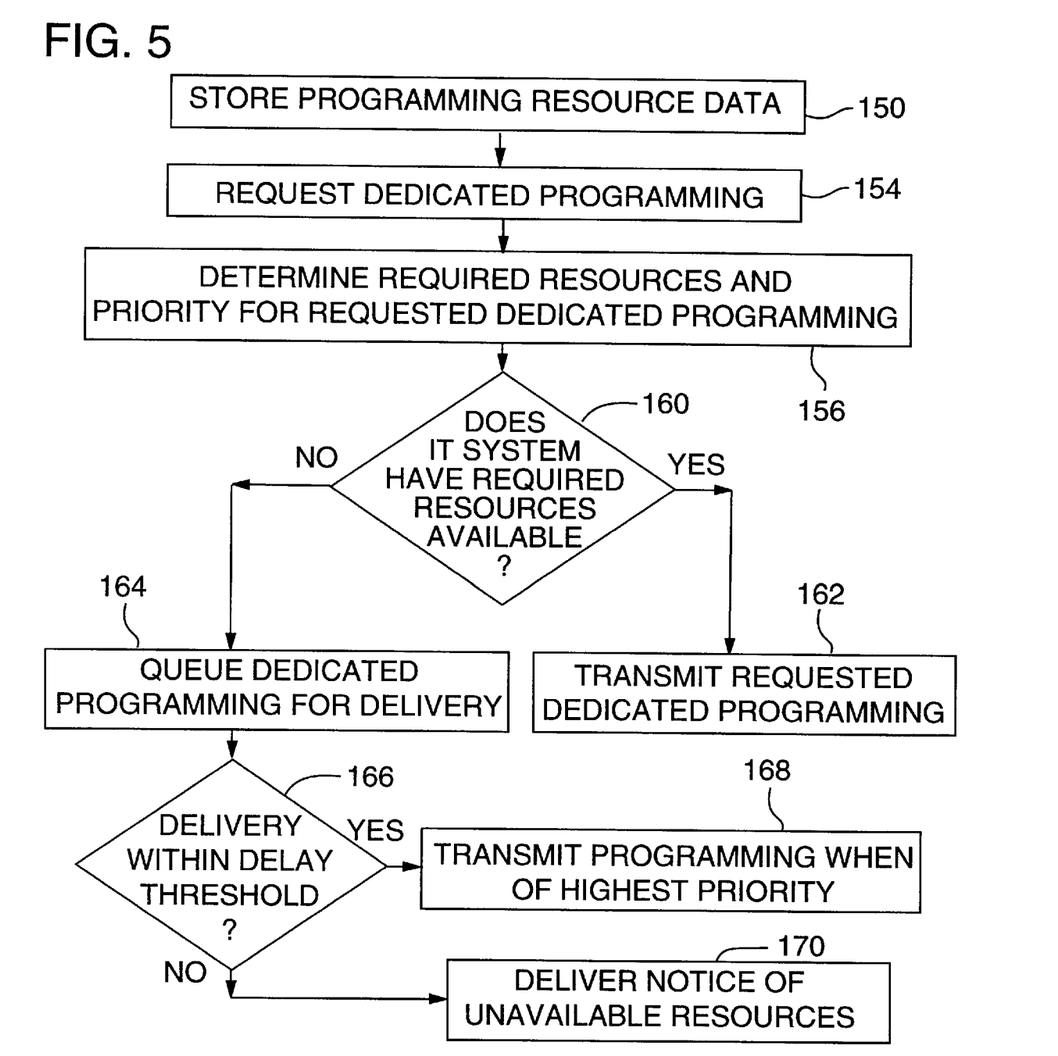
FIG. 5 is a flow diagram of a second preferred method of allocating resources of an interactive televideo system for delivering dedicated programming to viewers.

FIG. 5 is a flow diagram showing a second preferred embodiment of a method of allocating IT system resources to deliver dedicated programming services to viewers associated with IT system 10. In this embodiment, the method includes delivering dedicated programming services according to relative priorities assigned to the programming whenever IT system resources are at or near their capacity.

Dedicated programming services assigned higher priority or other valuations are delivered preferentially over programming of lower priority or valuation. In the preferred embodiment, all programming for which delivery is begun is delivered in its entirety. Accordingly, preferential delivery of programming relates to preferentially beginning delivery of dedicated programming of higher priorities. This manner of delivering programming minimizes service interruptions, which are highly disfavored.

Process block 150 indicates that IT system 10 stores programming resource data representing the resources of IT system 10 that are required to deliver to a viewer dedicated programming available from the dedicated programming service. The programming resource data also includes a priority or other valuation of the dedicated programming. The programming resource data, including the valuation data, preferably are arranged as a programming resource database of the type described above with reference to FIG. 4.

The priority or other valuation ranks the dedicated programming relative to other available dedicated programming. The programming priority can be based upon several factors including the potential revenue for delivering the programming. Such revenue can be received the operator of IT system 10 either from the viewer requesting the dedicated service or, in the case of a POD service, from the provider of the previews and previewed or advertised programming as an advertising fee.

Process block 154 indicates that a viewer at a selected viewer station 16 requests a dedicated programming service from IT system 10.

Process block 156 indicates that central control node 12 determines from the dedicated programming database the system resources required for the requested dedicated programming and its priority or valuation.

Decision block 160 represents an inquiry as to whether IT system 10 has available the resources to meet the resource requirements of the requested dedicated programming. This inquiry is similar to the one described above with reference to decision block 130 of FIG. 4. Decision block 160 proceeds to process block 162 whenever IT system 10 has available sufficient resources to adequately transmit the requested dedicated programming, and otherwise proceeds to process block 164.

Process block 162 indicates that central control node 12 obtains and transmits the requested dedicated programming.

Process block 164 indicates that the requested dedicated programming is queued for delivery by IT system 10, upon availability of sufficient IT system resources, according to the priority or valuation of the requested dedicated programming relative to other dedicated programming being requested. The other dedicated programming may be requested from the same dedicated programming service (e.g., video-on-demand) or different services (e.g., previews-on-demand or a game service). The relative priorities or valuations of the dedicated programming queued for delivery are determined from, for example, the programming resource database.

Decision block 166 represents an inquiry whether the dedicated programming request is positioned within the queue so as to be delivered to the viewer within a threshold delay period (e.g., 5 seconds). The threshold delay period represents a period that is generally acceptable to viewers as a delay between requesting and receiving dedicated programming. Decision block 166 proceeds to process block 168 whenever dedicated programming request is positioned within the queue so as to be delivered to the viewer within the threshold delay period, and otherwise proceeds to process block 170.

Process block 168 indicates that the requested dedicated programming is delivered by IT system 10 when the requested dedicated programming has the highest priority in the queue and IT system 10 has available sufficient resources upon completing delivery of dedicated programming previously being transmitted. Dedicated programming requests of the same priority can be ordered within the queue according to the sequence in which IT system 10 receives them.

Process block 170 indicates that IT system 10 delivers a notice to the viewer requesting the dedicated programming that system resources are unavailable for the requested programming. IT system 10 can provide the viewer with a variety of options for responding to the notice, including canceling the request and maintaining the request indefinitely.

It will be appreciated that IT system 10 will preferably have capacity for delivering a substantial number of dedicated programming services simultaneously. The dedicated programming services will typically be requested by viewers at widely distributed times and will have a variety of durations. Accordingly, the availability of IT system resources can change dynamically with the substantially uncorrelated requests for and completion of dedicated programming services. The methods of FIGS. 4 and 5 would allocate IT system resources within such a dynamic environment.

It will be appreciated that the valuations described with reference to the method of FIG. 5 for ordering dedicated programming requests within a queue can include the level of IT system resources required to deliver the requested dedicated programming. The valuations of dedicated programming requests can be arranged according to successively increasing or decreasing amounts of required IT system resources to emphasize delivery of different types of dedicated programming according to market conditions.

Moreover, the valuations for ordering dedicated programming requests within a queue can include indications of the dedicated programming formats previously delivered to each viewer. For example, if all viewers associated with IT system 10 subscribe to the same level of dedicated programming services, it could be desirable to prevent some viewers from consistently receiving dedicated programming services in the highest quality format when other subscribers do not.

The valuations associated with dedicated programming requests can include indications of past levels of dedicated programming service delivered to the requesting viewers. A dedicated programming request from a viewer who has received more than a threshold level of high quality format dedicated programming within a period (e.g., one month) may be positioned in the queue behind a request from a viewer who has received less high quality format dedicated programming, or who has received dedicated programming in alternate formats. As another example, if viewers associated with IT system 10 subscribe to different levels of dedicated programming services, such valuations could provide availability of such service levels to match the subscription levels.

Referring to FIG. 1 central control node 12 includes a digital local area network (LAN) 200 with multiple computer servers 202 for performing various interactive system applications or functions. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information. For example, central control node 12 receives programming data representing the predetermined characteristics of scheduled programming at gateway 204.

Servers 202 may include, for example, service and application servers 202a and continuous media servers 202b. Service and application servers 202a process interactive service requests from subscribers and provide services and applications associated with operation of IT system 10. Service and application servers 202a may be dedicated to particular applications such as an electronic programming guide for viewers, network security, monitoring, object storage, financial transactions, data access, and other administration functions including storing and utilizing the programming resource database according to the methods of FIGS. 4 and 5.

Continuous media servers 202b provide storage and on-demand or near on-demand delivery of digitized video information or dedicated programming. The digitized video information can include video programming of substantially any duration ranging from individual image frames and brief video clips to full-length motion pictures.

Servers 202 communicate with station controllers 12 via a network communication switch 208, such as an asynchronous transfer mode (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, delivery of at least selected programming requiring selected resources of the interactive televideo system, a method of allocating selected resources for delivering the selected programming to a viewer station, comprising:

identifying preferred and alternative resources for delivering the selected programming to the selected viewer station in a preferred format and in an alternative format, respectively, the preferred resources of the preferred format requiring more of the selected resources of the interactive televideo system than the alternative resources of the alternative format;

identifying the interactive televideo system resources available for delivering the selected programming in the preferred format to the selected viewer station;

if the interactive televideo system has at least the preferred resources available, delivering the selected programming in the preferred format to the selected viewer station; and if the interactive televideo system has available at least the alternative resources but not the preferred resources, delivering the selected programming in the alternative format to the selected viewer station.

2. The method of claim 1 in which the preferred and alternative formats of the selected programming include digital video display formats of greater and lesser resolution, respectively.

3. The method of claim 1 in which the preferred and alternative formats of the selected programming include digital audio formats of greater and lesser resolution, respectively.

4. The method of claim 1 in which the preferred and alternative formats of the selected programming include graphic display formats of greater and lesser resolution, respectively.

5. The method of claim 1 in which the alternative resources are a subset of the preferred resources.

6. The method of claim 1 in which a hierarchy of display format classes relates to the selected programming, the hierarchy of display format classes including in descending order at least two of video display imagery, animated graphic display imagery, and still image display imagery, and the preferred and alternative formats are included within a single display format class.

7. The method of claim 1 in which a hierarchy of display format classes relates to the selected programming, the hierarchy of display format classes including in descending order at least two of video display imagery, animated graphic display imagery, and still image display imagery, and the preferred format is included in a hierarchically superior display format class than is the alternative format.

8. The method of claim 1 in which the selected programming is dedicated programming that is deliverable to the selected viewer station individually.

9. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, delivery of at least selected programming requiring selected resources of the interactive televideo system, a method of allocating the selected resources for delivering the selected programming, comprising:

identifying first selected resources for delivering first selected programming to a first selected viewer station and a first valuation of the first selected programming;

identifying second selected resources for delivering second selected programming to a second selected viewer station and a second valuation of the second selected programming, the second valuation being lower than that of the first valuation;

identifying the interactive televideo system resources available for delivering the first and second selected programming to the respective first and second selected viewer stations;

if the interactive televideo system has the resources available for delivering simultaneously the first and second selected programming to the respective first and second selected viewer stations, simultaneously delivering the first and second selected programming to the respective first and second selected viewer stations;

if the interactive televideo system does not have the resources available for delivering simultaneously the first and second selected programming to the respective first and second selected viewer stations, successively delivering the first selected programming to the first selected viewer station and the second selected programming to the second selected viewer station.

10. The method of claim 9 in which the first and second valuations correspond to, respectively, the first and second selected resources for delivering the first and second selected programming.

11. The method of 10 in which the first selected resources of the first selected programming require more of the selected resources of the interactive televideo system than the second selected resources of the second selected programming.

12. The method of 10 in which the first selected resources of the first selected programming require less of the selected resources of the interactive televideo system than the second selected resources of the second selected programming.

13. The method of claim 9 in which the first and second valuations correspond to amounts of selected programming previously delivered to the first and second selected viewer stations, respectively.

14. The method of claim 9 in which the first and second valuations correspond to amounts of selected programming subscribed to by the first and second selected viewer stations, respectively.

15. The method of claim 9 in which the selected programming is dedicated programming that is deliverable to the first and second selected viewer stations individually.

16. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, the programming including dedicated programming that is delivered to a selected viewer station according to a request therefrom, the televideo system having selected resources for delivering dedicated programming to a selected viewer station, a memory associated with the interactive televideo system, comprising:

programming resource data stored in the memory and representing selected resources of the televideo system required to deliver the dedicated programming to the selected viewer station.

17. The memory of claim 16 further comprising programming valuation data stored in the memory and representing a priority for delivering the dedicated programming relative to delivering other dedicated programming.

18. The memory of claim 17 in which the programming valuation data are proportional to the selected resources of the televideo system required to deliver the dedicated programming to the selected viewer station.

19. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, the programming including dedicated programming that is delivered to a selected viewer station according to a request therefrom, the televideo system having selected resources for delivering dedicated programming to a selected viewer station, a memory associated with the interactive televideo system, comprising:

programming resource data stored in the memory and representing selected resources of the televideo system required to deliver the dedicated programming to the selected viewer station; and programming valuation data stored in the memory and representing a priority for delivering the dedicated programming relative to delivering other dedicated programming wherein the programming valuation data are inversely proportional to the selected resources of the televideo system required to deliver the dedicated programming to the selected viewer station.

20. The memory of claim 17 in which the programming valuation data are proportional to an amount of dedicated programming previously delivered to the selected viewer station.

21. The memory of claim 17 in which the programming valuation data are proportional to an amount of dedicated programming subscribed to by the selected viewer station.

* * * * *